3,459,463
BOUNDARY SEAL FOR TEST CHAMBERS
USING A VIBRATOR
Ronald L. Nacht, Hewlett, N.Y., assignor to
Tenney Engineering, Inc., Union, N.J.
Filed Aug. 29, 1967, Ser. No. 664,124
Int. Cl. A47b 97/00, 95/00, 96/00
U.S. Cl. 312—352
12 Claims

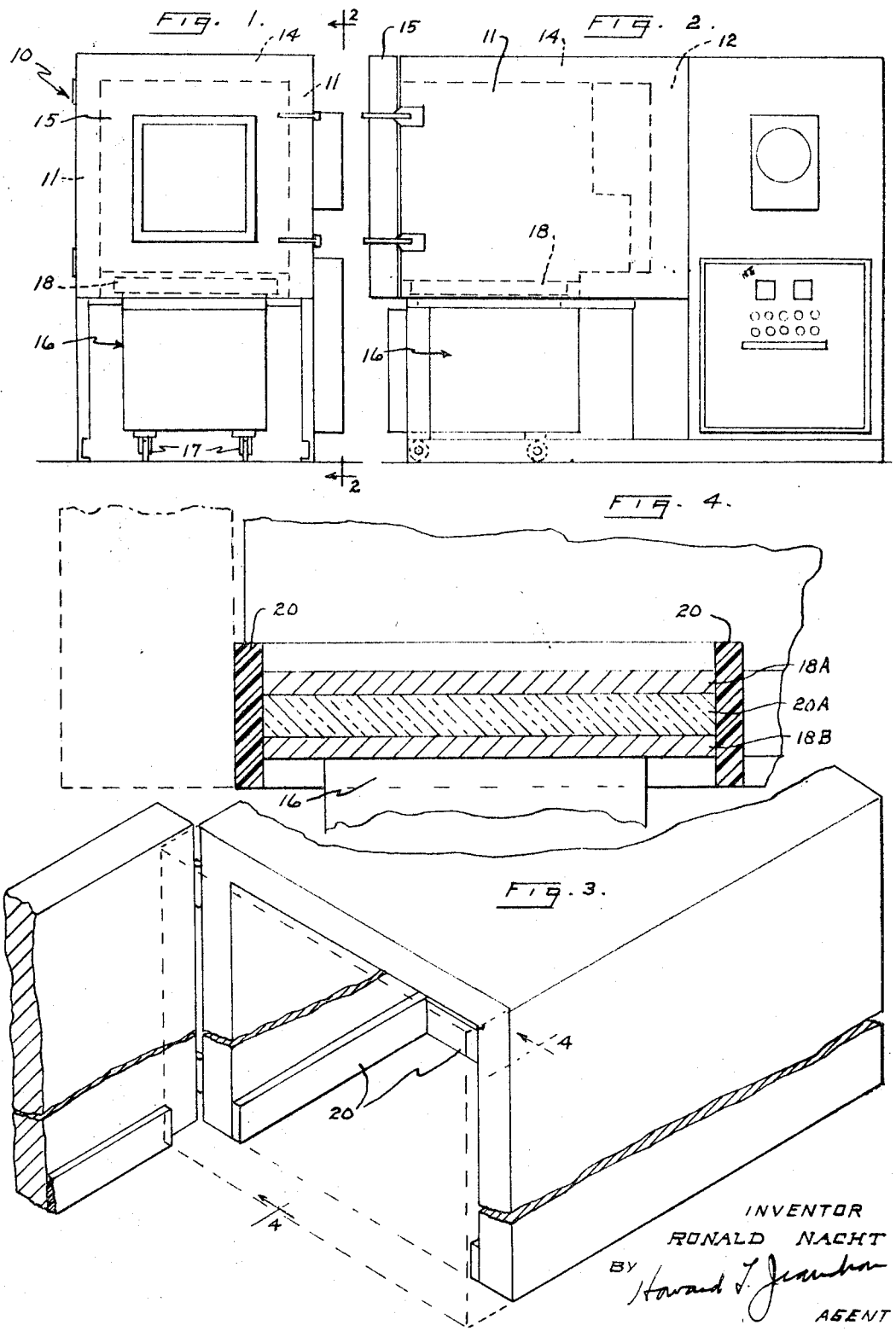

ABSTRACT OF THE DISCLOSURE

A seal for a temperature humidity variable atmospheric pressure chamber in which the chamber has one side open and there is provided a vibrator unit with a flat panel to fit and enclose said open side of the test chamber. An elastomeric foam boundary seal around the periphery of said flat panel to be pressed into abutting relationship with the open side of said test chamber to maintain a sealed chamber during the oscillatory movement of the flat panel.

---

This invention relates to a seal for a temperature-humidity chamber and more particularly a seal between a test chamber wall and a flat panel top of a vibrator in which said seal is maintained during the oscillating movements of said vibrator.

When a test chamber is required to be maintained under specific temperature and humidity conditions, it is sometimes difficult to provide other conditions that are also required, such as a vibration test. The vibrator must either be inserted in the test chamber, or with an open bottom in the test chamber, the top of the vibrator may be rolled into position to provide a bottom panel for the test chamber. In this instance the panel must be slid into the test chamber with the front door of the test chamber open to thus provide a bottom closure and the door is then closed to make a completely closed chamber. To make such a chamber tight to provide a seal between ambient temperature outside and variation in temperature and humidity inside, it is necessary to provide seals that abut with the panel on all four sides. Ordinary seals are not usually sufficient or reliable as the oscillatory movement of the vibrator tends to rupture any seal that lacks sufficient resilience and compressability.

It is an object of this invention to provide a seal namely, an elastomeric foam material that may be attached to the walls and the door of the test chamber and may be compressed by the top panel of the vibrator when it is slid into abutting relationship with the surrounding seal and in which said seal will, to a sufficient degree, prevent the passage of air or gas in or out of said chamber and will have sufficient resiliency to maintain said sealing barrier during the oscillatory movement of said top panel of a vibrator.

Further objects of this invention shall be apparent by reference to the accompanying detailed description and the drawings in which:

FIG. 1 is a front elevational view of a test chamber and vibrator,

FIG. 2 is a side elevational view taken on line 2—2 of FIG. 1,

FIG. 3 is a perspective illustration of the test chamber and,

FIG. 4 is an enlarged cross sectional view taken on line 4—4 of FIG. 3.

Referring to the drawings and particularly FIGS. 1 and 2, there is illustrated a test chamber 10 that is utilized for testing various objects under various atmospheres of changing humidity and temperature and in which the objects are also tested under a vibration test. The test chamber 10 comprises two side walls 11, a rear wall 12, a top wall 14 and a front door 15. The bottom of the chamber is open. A vibrator 16 mounted on wheels 17 is movable into position so that the top of vibrator 16, that is, a panel 18 becomes the closing floor or panel to complete the test chamber. Panel 18 must fit securely in the opening remaining in the lower portion of the test chamber. To insure a boundary seal about panel 18, referring to FIG. 3, there are provided strips of an elastomeric foam seal 20 positioned along each side wall and the abutting rear portion of the test chamber and along the bottom edge of the door so that panel 18 will slide between the strips 20 on either side until it abuts with the rear strip 20 thus being in position and the door 15 may then be closed so that the strip 20 on the door will abut with the front edge of panel 18 providing a complete seal about panel 18. Panel 18 may be comprised of a top metal plate 18A, a layer of insulation 20A and a second metal plate 18B thus providing an insulated panel. The panel thus insulates against the variations in temperature between the outside ambient temperature and the temperatures within the test chamber. The vibrator 16 may be of any particular form and design to preferably provide an amplitude of .07″ or less in oscillation and having a frequency of from 5 to 60 cycles per second. The particular foam material utilized was a polyether urethane foam manufactured by General Foam Corporation.

In a further embodiment of this invention, the elastomeric foam strips 20 may be affixed or cemented to the periphery of the panel 18 and the vibrator then is carefully moved into its position as illustrated in FIGS. 1 and 2. In this instance the foam will slide between the walls 11 of the test chamber to abut with the rear portion. To insure a perfect alignment of panel 18, the walls 11 and the rear wall 12 may be provided with a U-shaped channel member of a dimension to permit panel 18 and its foam seal to slide into the channels and be guided to a perfect sealing fit. The door will compress the foam seal when the test chamber is closed thus providing a complete insulated barrier for the test chamber to seal the test chamber from the outside air at ambient temperature and seal the inside of the test chamber at various temperatures during test. The foam seal also provides a complete seal during the action of the shaker in producing an oscillation to plate 18.

Although the boundary seal described above for use with a test chamber to insure a seal against the passage of air and to insure the seal during vibration has been described as an elastomeric foam seal, this seal, for example, may have an energy absorption greater than 75% with a low rebound such as less than 25%, it is to be understood that the seal may be a rubber seal or a fibrous material seal and in the event exceptionally high temperatures are to be considered, a silicone foam seal may be utilized to provide a seal during test where the temperatures vary from −120° F. to +500° F. It is also to be understood that the seal utilized, whether it be the elastomeric foam (natural or synthetic) or a rubber (natural or synthetic) or a fibrous material seal, it may be provided with a coating to decrease permeability of the sealing material and although the boundary seal has been suggested as being cemented to the walls of the test chamber or to the periphery of the vibrator panel, the manner of fastening the seal may be varied. It may be mechanically fastened thereto as long as the seal retains its position and permits a compression of the seal when the test chamber is closed for a cycle of operation. It is also to be understood that the elastomeric foam seal utilized has a very low static load carrying characteristic and is therefore carefully inserted so that there is no load carrying or extremely low load carrying characteristics. It is also to be understood that the thickness of the boundary strips may be varied according to the desired amplitude of the vibrator plate, Normally with the amplitude of vibration above stated, the thickness of the foam material may be of a minimum of 1" and may be increased as required. It is also to be understood that although the test chamber shown in this embodiment is rectangular in form, the test chamber may be square or it may be round with one portion fitted with a circular door to permit sliding the vibrator into position without departing from the spirit of this invention and although the test chamber is shown in a vertical upright position with the vibrator mounted below the test chamber, the test chamber may be positioned in a horizontal position with the vibrator thus providing one of the vertical walls of the test chamber without departing from the spirit of this invention and although we have described a particular test chamber, it is to be understood that any test chamber may be similarly provided with a boundary seal and the vibrator may be slid into position as described or may be moved into position in any other manner to provide the complete boundary seal without departing from the spirit of this invention.

What is claimed is:

1. A seal for a test chamber comprising in combination, a test chamber having enclosing walls, an enclosing top, a door and a bottom opening, a unit producing vibrations supported in a movable relationship, said unit having a panel that is part of said test chamber, a plurality of sealing strips that are resilient and resistant to penetration by a fluid, said unit moved so that its panel is in a mating relationship with the opening of the test chamber, said sealing strips inserted between the panel of the unit and the enclosing opening of the test chamber to provide a fluid barrier when said test chamber is used to test equipment under a different atmosphere than the surrounding atmosphere.

2. In a device according to claim 1 in which the seal is a natural or synthetic elastomeric foam material of structure having a high energy dissipation greater than 75% with a low rebound less than 25%.

3. In a device according to claim 1 in which the seal has a high energy dissipation greater than 75% with a low rebound less than 25%.

4. In a device according to claim 1 in which the seal is a silicone foam having a resistance to temperature variation between $-120°$ and $+500°$ F.

5. In a device according to claim 1 in which the seal is a natural or synthetic rubber.

6. In a device according to claim 1 in which the seal is a fibrous material.

7. In a device according to claim 1 in which the seal thickness may be varied.

8. In a device according to claim 1 in which the seal is attached to the periphery of the bottom opening of the test chamber in its closed relationship.

9. In a device according to claim 1 in which the seal is attached to the edges of the top panel of said vibrator.

10. In a device according to claim 1 in which the bottom opening of the test chamber is quadrangular.

11. In a device according to claim 1 in which the bottom opening of the test chamber is round.

12. In a device according to claim 1 in which the attitude of the test chamber is changed to a different plane and the top panel of the unit is positioned in a plane with the open portion of the test chamber.

References Cited

UNITED STATES PATENTS

| 3,079,277 | 2/1963 | Painter | 248—21 X |
| 3,264,004 | 8/1966 | Sciaky | 34—242 X |
| 3,268,199 | 8/1966 | Kordyban et al. | 248—21 |
| 3,311,437 | 3/1967 | Peebles | 312—296 |
| 3,351,314 | 11/1967 | Hirsch et al. | 248—1 X |

JAMES T. McCALL, Primary Examiner

U.S. Cl. X.R.

312—250, 296